US007949175B2

(12) United States Patent
Fan

(10) Patent No.: US 7,949,175 B2
(45) **Date of Patent: *May 24, 2011**

(54) COUNTERFEIT DETERRENCE USING DISPERSED MINIATURE SECURITY MARKS

(75) Inventor: Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1157 days.

This patent is subject to a terminal disclaimer.

(21) Appl. No.: 11/656,667

(22) Filed: Jan. 23, 2007

(65) Prior Publication Data

US 2008/0174101 A1 Jul. 24, 2008

(51) Int. Cl.
*G06K 9/00* (2006.01)
*H04N 1/40* (2006.01)

(52) U.S. Cl. ........ 382/135; 382/137; 382/100; 358/3.28

(58) Field of Classification Search .................. 382/135, 382/137, 100; 358/3.28
See application file for complete search history.

(56) References Cited

U.S. PATENT DOCUMENTS 6,694,042 B2 2/2004 Seder et al.
6,711,277 B1 * 3/2004 Cok .............................. 382/100
7,002,704 B1 2/2006 Fan
7,027,189 B2 * 4/2006 Umeda ........................ 358/3.03
7,130,087 B2 * 10/2006 Rhoads ........................ 358/3.28
7,142,689 B2 * 11/2006 Hayashi et al. ............... 382/100
7,372,594 B1 * 5/2008 Kusakabe et al. .............. 358/1.9
7,554,699 B2 * 6/2009 Wang et al. .................. 358/3.28
7,676,058 B2 * 3/2010 Fan .............................. 382/100
7,864,979 B2 1/2011 Fan
2001/0030759 A1 * 10/2001 Hayashi et al. ................ 358/1.9
2002/0044677 A1 4/2002 Fox
2002/0085238 A1 * 7/2002 Umeda ........................ 358/3.28
2002/0135810 A1 * 9/2002 Ikenoue et al. .............. 358/3.28
2004/0126152 A1 * 7/2004 Iida et al. ...................... 399/302
2004/0156081 A1 * 8/2004 Bril et al. ...................... 358/3.28
2005/0219634 A1 * 10/2005 Murakami ................... 358/3.28
2006/0115110 A1 6/2006 Rodriguez et al.
2006/0209332 A1 * 9/2006 Izumikawa ................. 358/1.14
2006/0262341 A1 * 11/2006 Matsuda ...................... 358/1.14
2006/0262957 A1 11/2006 Asano (Continued)

FOREIGN PATENT DOCUMENTS

EP 0917113 A 5/1999
EP 1059800 A 12/2000

(Continued)

OTHER PUBLICATIONS

U.S. Appl. No. 11/317,768, filed Dec. 23, 2005, Zhigang Fan.

(Continued)

*Primary Examiner* — Wenpeng Chen
(74) *Attorney, Agent, or Firm* — MH2 Technology Law Group LLP

(57) ABSTRACT

A method is disclosed for detection of miniature security mark configurations within documents and images, wherein the miniature security marks are in the form of dispersed miniature security marks and may include data marks or a combination of data marks and anchor marks. The method includes sub-sampling a received image, which is a digital representation possible recipient(s) of the miniature security marks, to generate a reduced-resolution image of the received image. Maximum/minimum points detection is performed and the maximum/minimum points are grouped into one or more clusters according to location distances between the maximum/minimum points. Group configuration is checked to match the clusters with a pre-defined template configuration. Dot parameter verification is then performed to verify mark location and configuration between the received image and a pre-defined template dot specification.

20 Claims, 6 Drawing Sheets
(2 of 6 Drawing Sheet(s) Filed in Color)

U.S. PATENT DOCUMENTS

| | | | | |
|---|---|---|---|---|
| 2006/0280515 A1* | 12/2006 | Harada | ........................... | 399/80 |

FOREIGN PATENT DOCUMENTS

| | | | |
|---|---|---|---|
| EP | 1229725 | A | 8/2002 |
| JP | 2001103282 | A | 4/2001 |
| WO | WO 0139212 | | 5/2001 |

OTHER PUBLICATIONS

U.S. Appl. No. 11/472,695, filed Jun. 22, 2006, Zhigang Fan.
U.S. Appl. No. 11/502,808, filed Aug. 11, 2006, Zhigang Fan.
U.S. Appl. No. 11/502,987, filed Aug. 11, 2006, Zhigang Fan, et al.

* cited by examiner

COUNTERFEIT DETERRENCE USING DISPERSED MINIATURE SECURITY MARKS

CROSS-REFERENCE TO RELATED APPLICATIONS

The following co-pending applications, U.S. Publication No. 2007-0158434-A1, published Jul. 12, 2007, titled "Counterfeit Prevention Using Miniature Security Marks"; U.S. Pat. No. 7,715,057, issued May 11, 2010, titled "Hierarchical Miniature Security Marks"; U.S. Publication No. 2008-0037822-A1, published Feb. 14, 2008, titled "System and Method for Embedding Miniature Security Marks"; and U.S. Pat. No. 7,676,058, issued Mar. 9, 2010, titled "System and Method for Detection of Miniature Security Marks", are assigned to the same assignee of the present application. The entire disclosures of these co-pending applications are totally incorporated herein by reference in their entireties.

BACKGROUND AND SUMMARY

This disclosure relates generally to methods and systems for counterfeit prevention, and more particularly to a system and method for utilizing and detecting dispersed miniature security marks to distinguish authentic documents and/or images from counterfeit documents and/or images.

Current counterfeit prevention systems are mainly based on the use of digital watermarks, a technique which permits the insertion of information (e.g., copyright notices, security codes, identification data, etc.) to digital image signals and documents. Such data can be in a group of bits describing information pertaining to the signal or to the author of the signal (e.g., name, place, etc.). Most common watermarking methods for images work in spatial or frequency domains, with various spatial and frequency domain techniques used for adding watermarks to and removing them from signals.

For spatial digital watermarking the simplest method involves flipping the lowest-order bit of chosen pixels in a gray scale or color image. This works well only if the image will not be subject to any human or noisy modification. A more robust watermark can be embedded in an image in the same way that a watermark is added to paper. Such techniques may superimpose a watermark symbol over an area of the picture and then add some fixed intensity value for the watermark to the varied pixel values of the image. The resulting watermark may be visible or invisible depending upon the value (large or small, respectively) of the watermark intensity.

Spatial watermarking can also be applied using color separation. In this approach, the watermark appears in only one of the color bands. This type of watermark is visibly subtle and difficult to detect under normal viewing conditions. However, when the colors of the image are separated for printing or xerography, the watermark appears immediately. This renders the document useless to the printer unless the watermark can be removed from the color band. This approach is used commercially for journalists to inspect digital pictures from a photo-stockhouse before buying un-watermarked versions.

There are several drawbacks to utilizing digital watermarking technology. To retrieve a watermark, extraction hardware and/or software is generally employed. Because a digital watermark usually has a fairly large footprint, detectors employed to read the digital watermarks often require significant buffering storage, which increases detection costs.

An alternate counterfeit prevention system, miniature security marks, may be utilized to remedy this problem. Miniature Security Marks (MSMs) are composed of small, virtually invisible marks that form certain configurations. The MSMs can be embedded in documents or images to be protected. When the documents or images are scanned, processed, and sent to a printer, the MSM detectors in the imaging system may recognize the embedded MSM marks and defeat the counterfeit attempts. The MSM has an advantage over existing technologies, such as watermarking, in that it requires only very simple and inexpensive detectors. Consequently, the MSM may be applied to many devices in a cost-effective manner. Although the MSM marks are invisible or almost invisible to the unaided human eye due to their small sizes, it would be preferable to further reduce their visibility for the enhancement of security.

All U.S. patents and published U.S. patent applications cited herein are fully incorporated by reference. The following patents or publications are noted:

U.S. patent application Publication No. 2006/0115110 to Rodriguez et al. ("Authenticating Identification and Security Documents") describes a system for authenticating security documents in which a document includes a first surface having a first and second set of print structures and a second surface. The sets of print structures cooperate to obscure the location on the first surface of the second set of print structures. The second set of print structures is arranged on the first surface so to provide a reflection pattern, such as a diffraction grating. The second set of print structures is preferably provided with metallic ink on the first surface.

U.S. Pat. No. 6,694,042 to Seder et al. ("Methods for Determining Contents of Media") enables a variety of document management functions by printing documents with machine readable indicia, such as steganographic digital watermarks or barcodes. The indicia can be added as part of the printing process (after document data has been output by an originating application program), such as by printer driver software, by a Postscript engine in a printer, etc. The indicia can encode data about the document, or can encode an identifier that references a database record containing such data. By showing the printed document to a computer device with a suitable optical input device, such as a webcam, an electronic version of the document can be recalled for editing, or other responsive action can be taken.

U.S. Pat. No. 7,002,704 to Fan ("Method and Apparatus for Implementing Anti-counterfeiting Measures in Personal Computer-based Digital Color Printers") teaches a system for rendering an electronic image representation associated with a software application program. The system includes a PC-based host processor programmed to execute the software application program, a temporary storage device associated with the host processor, and a printer interfaced to the host processor. A printer driver routine is operative on the host processor and determines whether the electronic image representation is of a counterfeit document by examining at least a portion of the electronic image representation when stored in the temporary storage device during the course of printing the electronic image representation at the printer.

The disclosed embodiments provide examples of improved solutions to the problems noted in the above Background discussion and the art cited therein. There is shown in these examples an improved method for detection of dispersed miniature security mark configurations within documents and images. The dispersed miniature security marks may include data marks or a combination of data marks and anchor marks. The method includes sub-sampling a received image, which is a digital representation possible recipient(s) of the dispersed miniature security marks, to generate a reduced-resolution image of the received image. Maximum/minimum points detection is performed and the maximum/minimum points are grouped into one or more clusters according to location distances between the maximum/minimum points. Group configuration is checked to match the clusters with a pre-defined template configuration. Dot parameter verification is then performed to verify mark location and configuration between the received image and a pre-defined template dot specification.

In an alternate embodiment there is disclosed a system for detection of miniature security mark configurations within documents and images. The miniature security marks are in the form of dispersed miniature security marks and may include data marks or a combination of data marks and anchor marks. The system includes means for sub-sampling a received image in the form of a digital representation of at least one possible recipient of the dispersed miniature security marks, which are in the form of a plurality of scattered dots. Sub-sampling generates a reduced-resolution image of the received image. Means are provided for performing maximum/minimum points detection and for grouping the maximum/minimum points into at least one cluster according to location distances between the maximum/minimum points. Group configuration is checked to match the clusters with a pre-defined template configuration. Dot parameter verification is performed to verify mark location and mark configuration between the received image and a pre-defined template dot specification. The pre-defined template includes a description of the plurality of scattered dots within an MSM.

In yet another embodiment there is disclosed a computer-readable storage medium having computer readable program code embodied in the medium which, when the program code is executed by a computer, causes the computer to perform method steps for detection of dispersed miniature security mark configurations within documents and images. The dispersed miniature security marks may include data marks or a combination of data marks and anchor marks. The method includes sub-sampling a received image, which is a digital representation possible recipient(s) of the dispersed miniature security marks, to generate a reduced-resolution image of the received image. Maximum/minimum points detection is performed and the maximum/minimum points are grouped into one or more clusters according to location distances between the maximum/minimum points. Group configuration is checked to match the clusters with a pre-defined template configuration. Dot parameter verification is then performed to verify mark location and configuration between the received image and a pre-defined template dot specification.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing and other features of the embodiments described herein will be apparent and easily understood from a further reading of the specification, claims and by reference to the accompanying drawings in which:

DETAILED DESCRIPTION

Figure 1:
FIG. 1 is an illustration of one embodiment of a standard MSM configuration.

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

Dispersed MSMs provide enhanced security features as compared to standard MSMs due to their reduction in visibility. MSMs are differentiated from image content and noise in three aspects: MSMs have significant color differences from the image background; each MSM has a pre-determined shape (circle, square, etc.); and MSMs form certain predetermined patterns. For hierarchical MSMs, the patterns can be decomposed into two layers, a bottom layer with a fixed pattern, and a top layer, which specifies the relative positions and orientations of the bottom layer groups. For the purposes of the discussion herein, the term MSM will include both hierarchical and non-hierarchical MSMs. MSM configurations and characteristics are described more fully in co-pending U.S. Publication No. 2007-0158434-A1 to Fan ("Counterfeit Prevention Using Miniature Security Marks") and U.S. Pat. No. 7,715,057 to Fan ("Hierarchical Miniature Security Marks") both assigned to the same assignee of the present application and hereby incorporated by reference in their entirety. A dispersed MSM is defined for the purposes herein as an MSM that consists of a plurality of scattered dots. The distribution of the dots within the MSM is arbitrary and may be either uniform or non-uniform.

The system includes an analyzer and a database that stores mark parameter information. The detection method includes sub-sampling to prepare a coarse image that can be analyzed efficiently. Using the coarse image, maximum/minimum points are detected using a mark feature, such as the color difference between the marks and the background. A group of candidate marks is isolated and evaluated to determine if they form predetermined patterns. The dot parameters of the marks are then verified based on specified templates.

Various computing environments may incorporate capabilities for supporting a network on which the system and method for dispersed MSMs may reside. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

Figure 2:
FIG. 2 is an illustration of one embodiment of a dispersed MSM configuration.
Figure 3:
FIG. 3 is an illustration of the dispersed MSM according to FIG. 2 at a greater enlargement.

Referring to FIG. 1, there is shown an illustration of a standard MSM in an enlarged version for ease of viewing. Standard MSMs are objects in the size range of 0.1-1.0 millimeter with pre-determined shapes, such as circle, square, rectangle, etc. In this illustration the standard MSMs consist of seven yellow marks 110 in a pattern on a partial sample document. In contrast to this, the dispersed MSMs disclosed herein are composed of a group of scattered dots much smaller in size (0.08-0.25 millimeter) than standard MSMs. An example illustration of one embodiment of a dispersed MSM configuration is shown in FIG. 2, in which each MSM is composed of a group of scattered, or dispersed, yellow dots 210. For the purposes of illustration and comparison, the same general configuration with a similar detection accuracy and the same enlargement level as FIG. 1 is shown. The dispersed MSM may be in the form of a group of dots that are scattered over a small region, for example a circle with a pre-determined radius. The total area of the dots determines the discriminant power, and thus the detection accuracy. Distribution of the dots is arbitrary, but some advantages may be achieved by uniformity. The size of the dots is determined by visibility and printability concerns, since some print engines may not reliably print extremely small dots. While for the purposes of illustration all MSMs are shown as being dispersed and of a similar set of parameters (number of dots per mark, dot size and dot distribution), it is noted that an MSM configuration may include both dispersed and non-dispersed MSMs and MSMs of varying parameters. A further enlargement is provided in FIG. 3, showing the dispersed MSMs 310. While for the purposes of illustration yellow dispersed MSMs are presented, the dispersed MSMs may be of any color that provides significant color differences from the image background. Additionally, each dispersed MSM may take the form of various pre-determined dot parameters, (the number of the dots per MSM, dot size, and dot distribution etc.), which are used to form certain pre-determined patterns, all of which are contemplated by the specification and scope of the claims herein.

Figure 4:
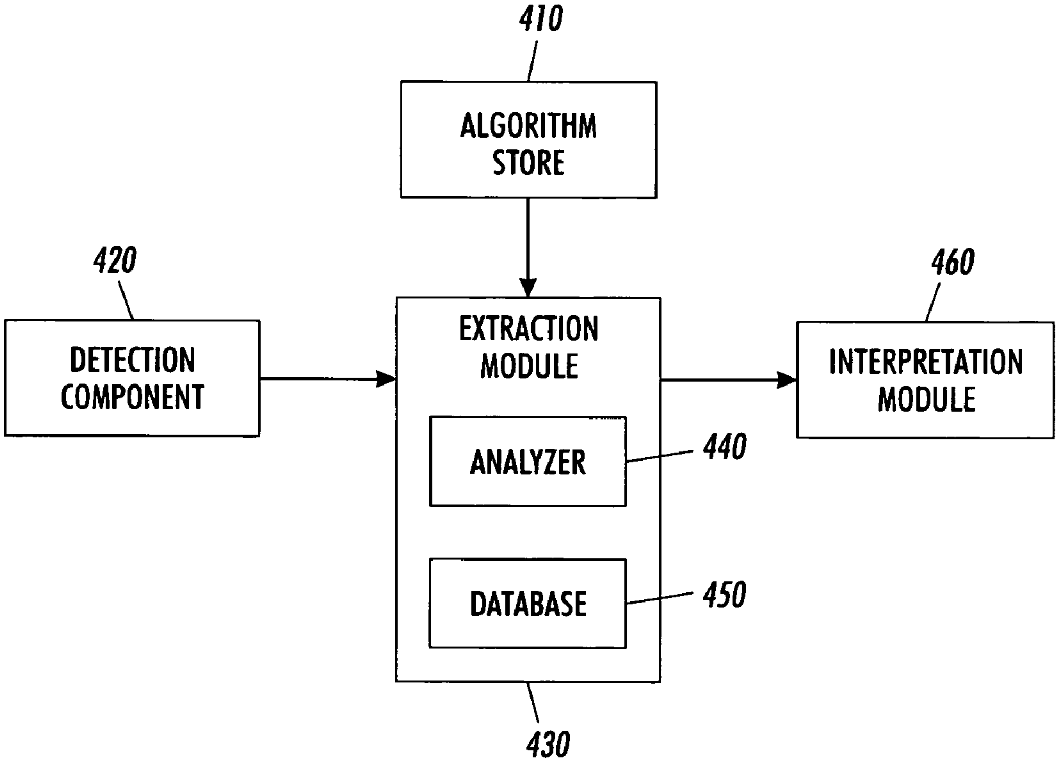
FIG. 4 is a functional block diagram of one exemplary embodiment of a system for detection of dispersed MSMs in documents and/or images.

Referring to FIG. 4, there is depicted a functional block diagram of one example embodiment of a system for detecting dispersed MSMs in documents and/or images. A security mark as used herein can be any mark (e.g., depression, impression, raised, overlay, etc.) that is applied to a recipient such as an image, a graphic, a picture, a document, a body of text, etc. The security mark can contain information that can be detected, extracted and/or interpreted. Such information can be employed to prevent counterfeiting by verifying that the information contained within the security mark is accurate, thereby verifying the authenticity of the recipient upon which the security mark is applied.

In one example, a security mark has a dispersed MSM configuration that includes at least one dispersed data mark and at least two dispersed anchor marks. The dispersed MSMs may have different colors and dot parameters. In particular, the anchor marks within an MSM configuration have at least one attribute (e.g., color, number of dots per MSM, dot size, dot distribution etc.) that is different than the at least one data marks. In this manner, no anchor mark can have all the same attributes of any data mark.

The location, color and/or dot parameters of the one or more data marks can determine the information contained therein. For example, an MSM configuration can contain nineteen data marks and two anchor marks. The color and dot parameters of both the anchor marks and data marks can be known such that the anchor marks can be distinguished from each other. In addition, the location of the anchor marks in each MSM configuration can be known to each other and known relative to the one or more data marks. In this manner, information can be stored and extracted from a MSM configuration utilizing one or more algorithms associated therewith. The one or more algorithms can utilize at least one of mark location, color and dot parameters to store and/or extract data from a MSM configuration.

Anchor marks can be employed to limit the amount of computational overhead employed in the detection and extraction of an MSM configuration. For example, greater detection requirements can be necessary since the rotation, shift and/or scaling of an image (and MSM configuration applied therein) is unknown. As a result, the computational complexity may grow exponentially as the number of marks increases. Generally, anchor marks can allow rapid determination of the location of an MSM configuration. In particular, the location of the at least one data mark relative to the anchor marks within the MSM configuration can be quickly determined. In this manner, excessive computation overhead can be mitigated. Moreover, MSM configurations can create smaller footprints than the digital watermarks, which can lower buffering storage requirements. This is particularly beneficial when a greater number of data and/or anchor marks are employed. In one aspect, a detector can first identify the anchor marks, and then use them to determine location, orientation and scaling parameters. These parameters can be applied to locate the data marks at a linear computational complexity.

As shown in FIG. 4, the system includes MSM detection module 430, algorithm store 410, and interpretation module 460. These devices are coupled together via data communication links, which may be any type of link that permits the transmission of data, such as direct serial connections.

The detection module 430 can employ one or more algorithms to extract information contained within one or more security marks. Algorithms can contain one or more formulae, equations, methods, etc. to interpret data represented by a particular security mark. In one example, the security mark is an MSM configuration wherein data is represented by two or more anchor marks and one or more data marks. The detection module 430 includes analyzer 440, which analyzes the location of the data marks relative to each other and/or relative to two or more anchor marks, as well as the location of the anchor marks relative to each other to insure that an MSM configuration exists in a particular location. The color and dot parameters etc. of the dots that compose the marks can also be analyzed to extract information contained within the one or more MSM configurations. Detection module 430 also includes database 450, which contains mark parameter information for each dispersed MSM.

The algorithm store 410 can be employed to store, organize, edit, view, and retrieve one or more algorithms for subsequent use. In one aspect, the detection module 430 can retrieve one or more algorithms from the algorithm store 410 to determine the information contained within an MSM configuration. In another aspect, the detection module 430 can determine the appropriate algorithm, methodology, etc. to extract information from one or more security marks and transmit such information to the algorithm store 410 for subsequent use.

The interpretation module 460 can determine the meaning related to data extracted from one or more security marks by the detection module 430. Such a determination can be made based on one or more conditions such as the location of the security mark, the recipient upon which the security mark is applied, the location of the system, one or more predetermined conditions, etc. In addition, a look up table, a database, etc. can be employed by the interpretation module 460 to determine the meaning of data extracted from a security mark. In one example, the security mark is related to the recipient upon which the security mark is applied. For instance, a data string "5jrwm38f6ho" may have a different meaning when applied to a one hundred dollar bill versus a one hundred euro bill.

The particular methods performed for detecting MSMs comprise steps which are described below with reference to a series of flow charts. The flow charts illustrate an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the disclosure herein.

Figure 5:
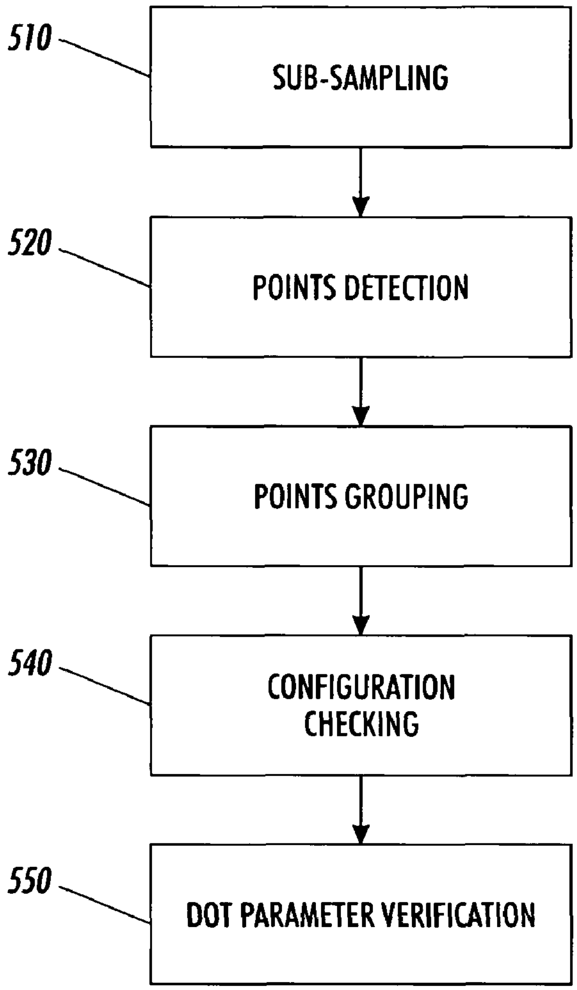
FIG. 5 is a flowchart outlining one exemplary embodiment of the method for detecting dispersed MSMs in documents and/or images.

Turning now to FIG. 5, a flowchart illustrates an example embodiment of the method for detecting dispersed MSMs in documents and/or images. At 510 sub-sampling is performed to generate a reduced-resolution version of the original image, which can be more efficiently analyzed. The sub-sampling and associated low-pass pre-smoothing reduce a dispersed MSM mark to a blurred spot that loses its detail information. The sub-sampling factor is selected such that the resulting mark size is reduced to about one pixel in the reduced-resolution image. Sub-sampling processes are well-known in the art and can be found, for example, in text books such as "*Digital Picture Processing*" by A. Rosenfeld and A. C. Kak, Academic Press, 1982. Maximum/minimum points detection is performed at 520, which divides the reduced-resolution image into disjoint windows, with each window having a plurality of pixels. In each window the maximum and/or minimum points are detected as the potential MSM locations. Depending on the MSM mark color, different color spaces may be operated on, and either maximum or minimum points identified. For example, if the marks are darker than the background in the L* component of the L*a*b* (the Commission Internationale de L'éclairage color standard) color space, the minimum value pixels in L* may be checked. The window size is chosen to be as large as possible with the constraint that no two marks will appear in the same window.

At 530 the system performs maximum/minimum points grouping, which includes grouping the points detected at 520 into clusters according to their location distances. Two points whose distance is smaller than a pre-determined threshold are considered to be in the same group and are candidates for the clusters. Group configuration checking is performed at 540 to match the groups obtained at 530 with a pre-defined template configuration, discussed more fully with reference to FIG. 6 below. At 550 the system performs dot parameter verification in the original resolution rather than in the reduced resolution version. From each point (in the reduced-resolution image) in the groups that satisfy group configuration checking, the corresponding position in the original image is found. The mark, or the template is rotated, according to the group orientation, and the dot parameters are verified by template matching. As the marks of a dispersed MSM consists of scattered dots, the template is a description of the scattered dots, specifically, the number of the dots, their sizes and relative positions.

Figure 6:
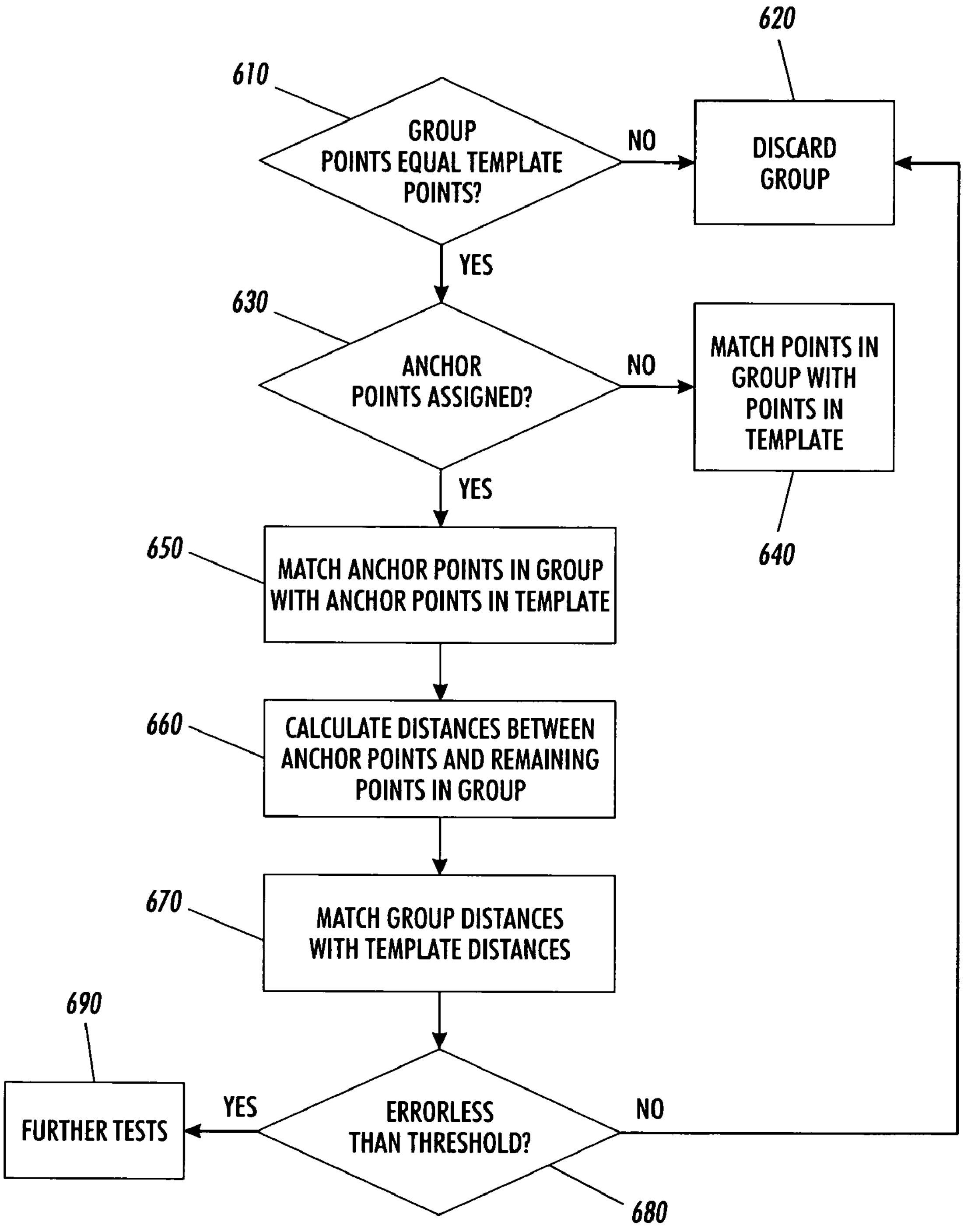
FIG. 6 is a flow chart outlining one exemplary embodiment of group configuration checking.
Figure 7:
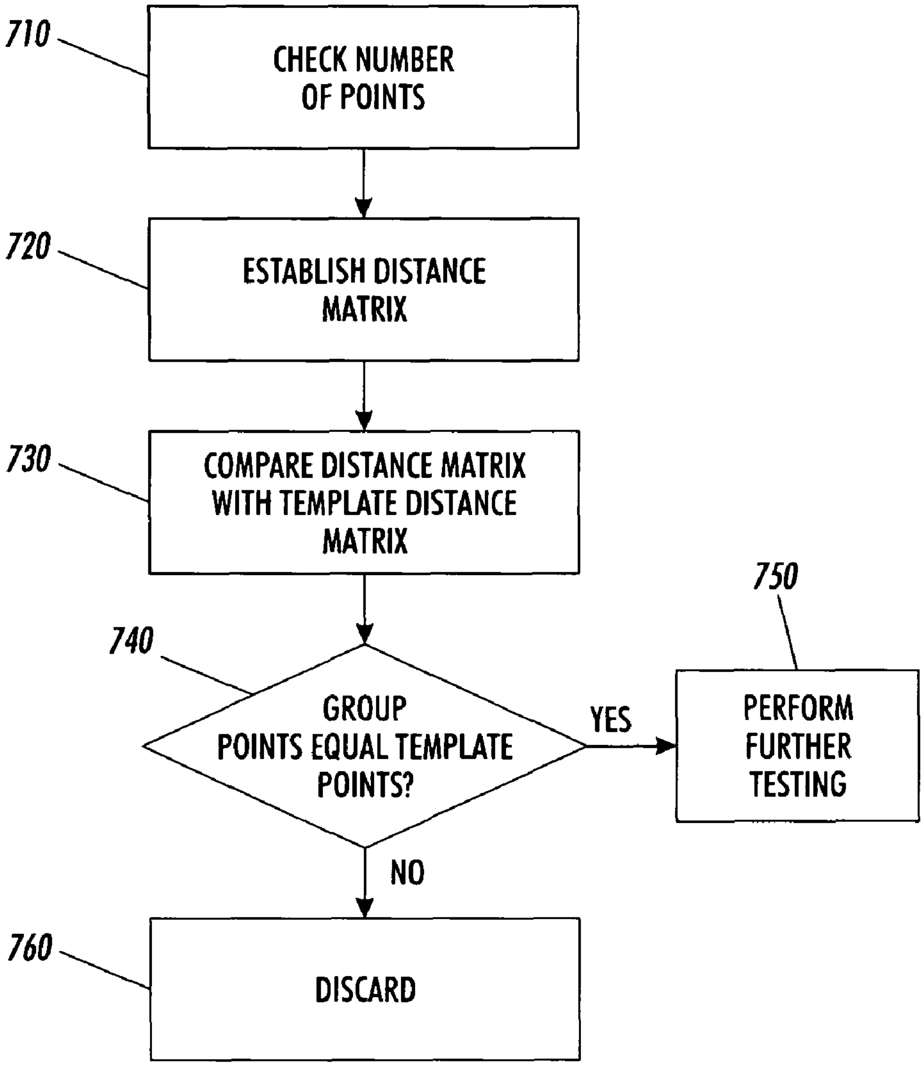
FIG. 7 is a flow chart outlining one exemplary embodiment of a method for matching MSM location points in a group with a template configuration.

Turning now to FIGS. 6 and 7, the flow charts illustrate example embodiments for group configuration checking, which matches the groups obtained through maximum/minimum points grouping with a pre-defined template configuration for each group. For each group, the system determines at 610 if the number of points in the group is equal to the number of points in the template. If this is not the case, the group is discarded at 620. For the remaining groups, a determination is made at 630 as to whether anchor points have been assigned. If no anchor points have been assigned, as is usually the case with hierarchical MSM, for which the number of points contained in a group is relatively small, the distances between points in the group are matched with the distances between points in the template at 340, discussed more fully with respect to FIG. 7 below.

Turning now to FIG. 7, the method for matching the points in the group with points in the template (640 above) is described in more detail. At 710 the number of points in the group is checked. The distances among the points within the group are calculated and tabled at 720 in an N×N matrix D, in which N is the number of points in the group and D(i,,j) is the distance between points i and j. At 730 matrix D is compared to matrix T, which is another N×N matrix that records the distances between points in the template. Matching is accomplished by minimizing an error measure, for example, $$E1=\mathrm{Min}_{i,j}[\Sigma_{m,n>m}|D(i,j)-T(m,n)|].$$

The index m extends from 1 to N and the index n extends from M+1 to N, since the matrices are symmetric and the diagonal values are always 0. At 740 the system determines whether E1 is smaller than a pre-determined threshold. If the threshold has not been exceeded, the group will be further tested at 750. Otherwise, it is discarded at 760. For hierarchical MSMs, an additional test is required to determine if the groups form certain pre-defined relationships, with the operations dependent on the defined relationship. For example, if an MSM requires three identical pattern groups with two of them in the same orientation and the third group rotated 90 degrees, the orientations of the groups would be evaluated to determine if any of them contain a θ, θ, θ+90° pattern.

Returning to FIG. 6, if anchor points have been defined, which is usual for a large group, the anchor points in the group are matched with the anchor points in the template. The anchor points typically differ in color from the rest points (non-anchor points) in the group, rendering them easily identifiable. The anchor points in the group are then matched with the anchor points in the template at 650, applying the method of FIG. 7, except that it is applied only to anchor points, rather than to all points in the group. After the anchor points in the group and the template have been matched, the distances between the anchor points and the rest of the points in the group are calculated at 660. These distances are tabled into a K×M matrix D1, in which K and M are the number of anchor and non-anchor points, respectively, and D(m,i) is the distance between points m and i. Matrix D1 is matched to matrix T1, which records the anchor and non-anchor distances for the template, at 670. In this example embodiment, matching is accomplished by minimizing an error measure, for example, $$E2=\mathrm{Min}_{i}[\Sigma_{m,n}|D(m,i)-T(m,n)|].$$

The system determines whether E2 is smaller than a pre-determined threshold at 380. If the error is less than the threshold, the group will be further tested at 690. Otherwise, it is discarded at 620.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for detection of configurations of miniature security marks (MSMs) within documents and images, wherein the MSMs are in a form of dispersed MSMs the method comprising:

sub-sampling a received image, wherein said received image comprises a digital representation of at least one possible recipient of the dispersed MSMs, wherein said sub-sampling generates a reduced-resolution image of said received image, and wherein each of said dispersed MSMs is comprised of a plurality of scattered dots;

detecting maximum/minimum points;

grouping said maximum/minimum points into at least one cluster according to location distances between said maximum/minimum points;

checking group configuration to match said at least one cluster with a pre-defined template configuration; and performing dot parameter verification to verify mark location and mark configuration between said received image and a pre-defined template dot specification, wherein said mark configuration comprises at least one dispersed MSM, wherein said pre-defined template dot specification comprises a description of said plurality of scattered dots, wherein said description includes at least one member selected from the group comprising dot size, the number of said dots in said MSM, and relative dot position.

2. The method according to claim 1, wherein said sub-sampling further comprises reducing MSM mark size to approximately one pixel in said reduced-resolution image.

3. The method according to claim 1, wherein said sub-sampling further comprises low-pass pre-smoothing to cause an MSM mark to lose detail information.

4. The method according to claim 1, wherein detecting said maximum/minimum points comprises:

dividing said reduced-resolution image into disjoint windows, wherein each of said disjoint windows comprises a plurality of pixels; and detecting the maximum/minimum points in each of said disjoint windows, wherein said maximum/minimum points are potential MSM locations.

5. The method according to claim 4, wherein said disjoint windows have a size, wherein said size is subject to a constraint that two potential MSM locations do not appear in a single disjoint window of said disjoint windows.

6. The method according to claim 1, wherein said at least one cluster comprises points whose distance does not exceed a pre-determined threshold.

7. The method according to claim 1, wherein checking group configuration further comprises:

determining if a number of maximum/minimum points in said at least one cluster is equal to a number of points in said pre-defined template dot specification;

if said number of maximum/minimum points in said at least one cluster does not equal the number of points in said pre-defined template dot specification, discarding said at least one cluster;

if said number of maximum/minimum points in said at least one cluster equals the number of points in said pre-defined template dot specification, determining whether anchor points have been defined within said at least one cluster, wherein said anchor points comprise marks having at least one attribute different from other marks within the mark configuration;

if said anchor points have not been defined, matching distances between points in said at least one cluster with distances between points in said pre-defined template dot specification;

if said anchor points have been defined, matching said anchor points within said at least one cluster with anchor points in said pre-defined template dot specification;

calculating distances between said anchor points and remaining marks in said at least one cluster and placing said distances in a combined distance matrix, wherein said combined distance matrix comprises anchor and non-anchor distances for said at least one cluster;

comparing said combined distance matrix with a combined template matrix, wherein said combined template matrix records the anchor and non-anchor distances between points in said pre-defined template dot specification;

minimizing an error measure;

determining whether said error measure is smaller than a pre-determined threshold;

if said pre-determined threshold is exceeded, discarding said at least one cluster; and if said pre-determined threshold is not exceeded, performing further testing operations to verify a match between said at least one cluster and said predefined template dot specification.

8. The method according to claim 7, wherein matching the distances between points in said at least one cluster with the distances between points in said pre-defined template dot specification comprises:

checking the number of maximum/minimum points in said at least one cluster;

calculating distances among the maximum/minimum points within said at least one cluster and placing said distances in a distance matrix;

comparing said distance matrix with a template matrix, wherein said template matrix records the distances between said points in said pre-defined template dot specification;

minimizing an error measure;

determining whether said error measure is smaller than a pre-determined threshold;

if said pre-determined threshold is exceeded, discarding said at least one cluster; and if said pre-determined threshold is not exceeded, performing further testing operations to verify a match between said at least one cluster and said predefined template dot specification.

9. The method according to claim 8, wherein said further testing operations are dependent on whether said at least one cluster forms pre-defined relationships.

10. The method according to claim 7, wherein matching said anchor points within said cluster with said anchor points in said pre-defined template dot specification comprises:

checking number of anchor points in said at least one cluster;

calculating distances among said anchor points within said at least one cluster and placing said distances in an anchor point distance matrix;

comparing said anchor point distance matrix with a template anchor point distance matrix, wherein said template anchor point distance matrix records the distances between anchor points in said pre-defined template dot specification;

minimizing an error measure;

determining whether said error measure is smaller than a pre-determined threshold;

if said pre-determined threshold is exceeded, discarding said at least one cluster; and if said pre-determined threshold is not exceeded, performing further testing operations to verify a match between said at least one cluster and said predefined template dot specification.

11. A system for detection of configurations of miniature security marks (MSMs) within documents and images, wherein the miniature security marks are in MSMs are in a form, the system comprising:

a processor configured to execute instructions comprising:

sub-sampling a received image, wherein said received image comprises a digital representation of at least one possible recipient of the dispersed MSMs, wherein said sub-sampling generates a reduced-resolution image of said received image, and wherein each of said dispersed MSMs is comprised of a plurality of scattered dots;

detecting maximum/minimum points detection;

grouping said maximum/minimum points into at least one cluster according to location distances between said maximum/minimum points;

checking group configuration to match said at least one cluster with a predefined template configuration; and performing dot parameter verification to verify mark location and mark configuration between said received image and a pre-defined template dot specification, wherein said pre-defined template dot specification comprises a description of said plurality of scattered dots, wherein said description includes at least one member selected from the group comprising dot size, the number of said dots in said MSM, and relative dot position.

12. The system according to claim 11, wherein said sub-sampling further comprises reducing MSM mark size to approximately one pixel in said reduced-resolution image.

13. The system according to claim 11, wherein said sub-sampling further comprises low-pass pre-smoothing to cause an MSM mark to lose detail information.

14. The system according to claim 11, wherein detecting said maximum/minimum points comprises:

dividing said reduced-resolution image into disjoint windows, wherein each of said disjoint windows comprises a plurality of pixels; and detecting the maximum/minimum points in each of said disjoint windows, wherein said maximum/minimum points are potential MSM locations.

15. The system according to claim 14, wherein said disjoint windows have a size, wherein said size is subject to a constraint that two potential MSM locations do not appear in a single disjoint window of said disjoint windows.

16. The system according to claim 11, wherein said at least one cluster comprises points whose distance does not exceed a pre-determined threshold.

17. The system according to claim 11, wherein checking group configuration further comprises:

determining if a number of maximum/minimum points in said at least one cluster is equal to a number of points in said pre-defined template dot specification;

if said number of maximum/minimum points in said at least one cluster does not equal the number of points in said pre-defined template dot specification, discarding said at least one cluster;

if said number of maximum/minimum points in said at least one cluster equals the number of points in said pre-defined template dot specification, determining whether anchor points have been defined within said at least one cluster, wherein said anchor points comprise marks having at least one attribute different from other marks within the mark configuration;

if said anchor points have not been defined, matching distances between points in said at least one cluster with distances between points in said pre-defined template dot specification;

if said anchor points have been defined, matching said anchor points within said at least one cluster with anchor points in said pre-defined template dot specification;

calculating distances between said anchor points and remaining marks in said at least one cluster and placing said distances in a combined distance matrix, wherein said combined distance matrix comprises anchor and non-anchor distances for said at least one cluster;

comparing said combined distance matrix with a combined template matrix, wherein said combined template matrix records the anchor and non-anchor distances between points in said pre-defined template dot specification;

minimizing an error measure;

determining whether said error measure is smaller than a predetermined threshold;

if said pre-determined threshold is exceeded, discarding said at least one cluster; and if said pre-determined threshold is not exceeded, performing further testing operations to verify a match between said at least one cluster and said pre-defined template dot specification.

18. The system according to claim 17, wherein matching the distances between points in said at least one cluster with the distances between points in said pre-defined template dot specification comprises:

checking the number of maximum/minimum points in said at least one cluster;

calculating distances among the maximum/minimum points within said at least one cluster and placing said distances in a distance matrix;

comparing said distance matrix with a template matrix, wherein said template matrix records the distances between said points in said pre-defined template dot specification;

minimizing an error measure;

determining whether said error measure is smaller than a predetermined threshold;

if said pre-determined threshold is exceeded, discarding said at least one cluster; and if said pre-determined threshold is not exceeded, performing further testing operations to verify a match between said at least one cluster and said predefined template dot specification.

19. The system according to claim 17, wherein matching said anchor points within said cluster with said anchor points in said pre-defined template dot specification comprises:

checking number of anchor points in said at least one cluster;

calculating distances among said anchor points within said at least one cluster and placing said distances in an anchor point distance matrix;

comparing said anchor point distance matrix with a template anchor point distance matrix, wherein said template anchor point distance matrix records the distances between anchor points in said pre-defined template dot specification;

minimizing an error measure;

determining whether said error measure is smaller than a predetermined threshold;

if said pre-determined threshold is exceeded, discarding said at least one cluster; and if said pre-determined threshold is not exceeded, performing further testing operations to verify a match between said at least one cluster and said predefined template dot specification.

20. A non-transitory computer-readable storage medium having computer readable program code embodied in said medium which, when said program code is executed by a computer causes said computer to perform method steps for detection of configurations of miniature security marks (MSMs) within documents and images, wherein the MSMs are in a form of dispersed MSMs, the method comprising:

sub-sampling a received image, wherein said received image comprises a digital representation of at least one possible recipient of the dispersed MSMs, wherein said sub-sampling generates a reduced-resolution image of said received image, and wherein each of said dispersed MSMs is comprised of a plurality of scattered dots detecting maximum/minimum points;

grouping said maximum/minimum points into at least one cluster according to location distances between said maximum/minimum points;

checking group configuration to match said at least one cluster with a pre-defined template configuration; and performing dot parameter verification to verify mark location and mark configuration between said received image and a pre-defined template dot specification, wherein said mark configuration comprises at least one dispersed MSM, wherein said pre-defined template dot specification comprises a description of said plurality of scattered dots, wherein said description includes at least one member selected from the group comprising dot size, the number of said dots in said MSM, and relative dot position.

* * * * *